Dec. 22, 1959 V. H. ANTARAMIAN 2,918,326
MOBILE VEHICLE CARRIER

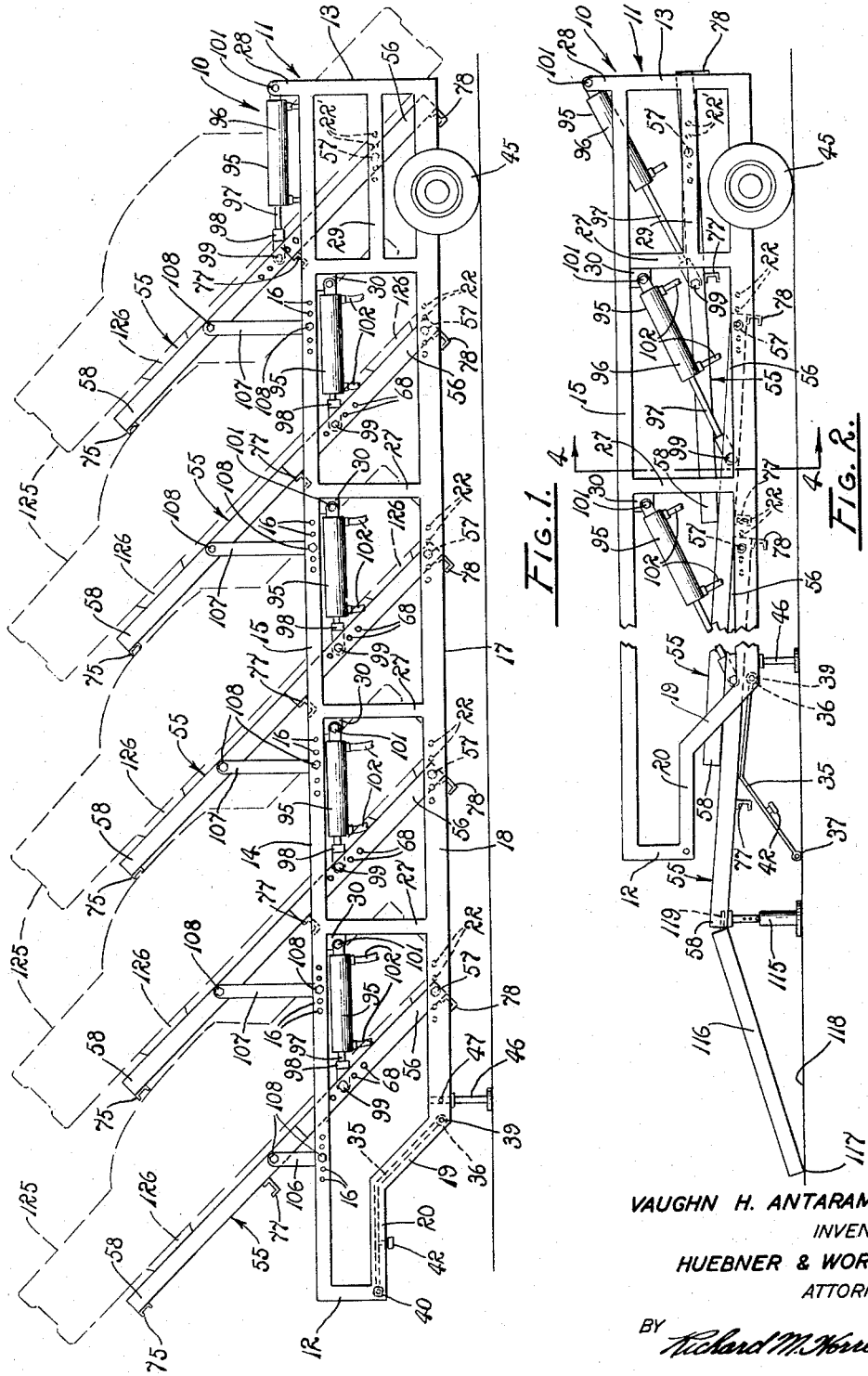

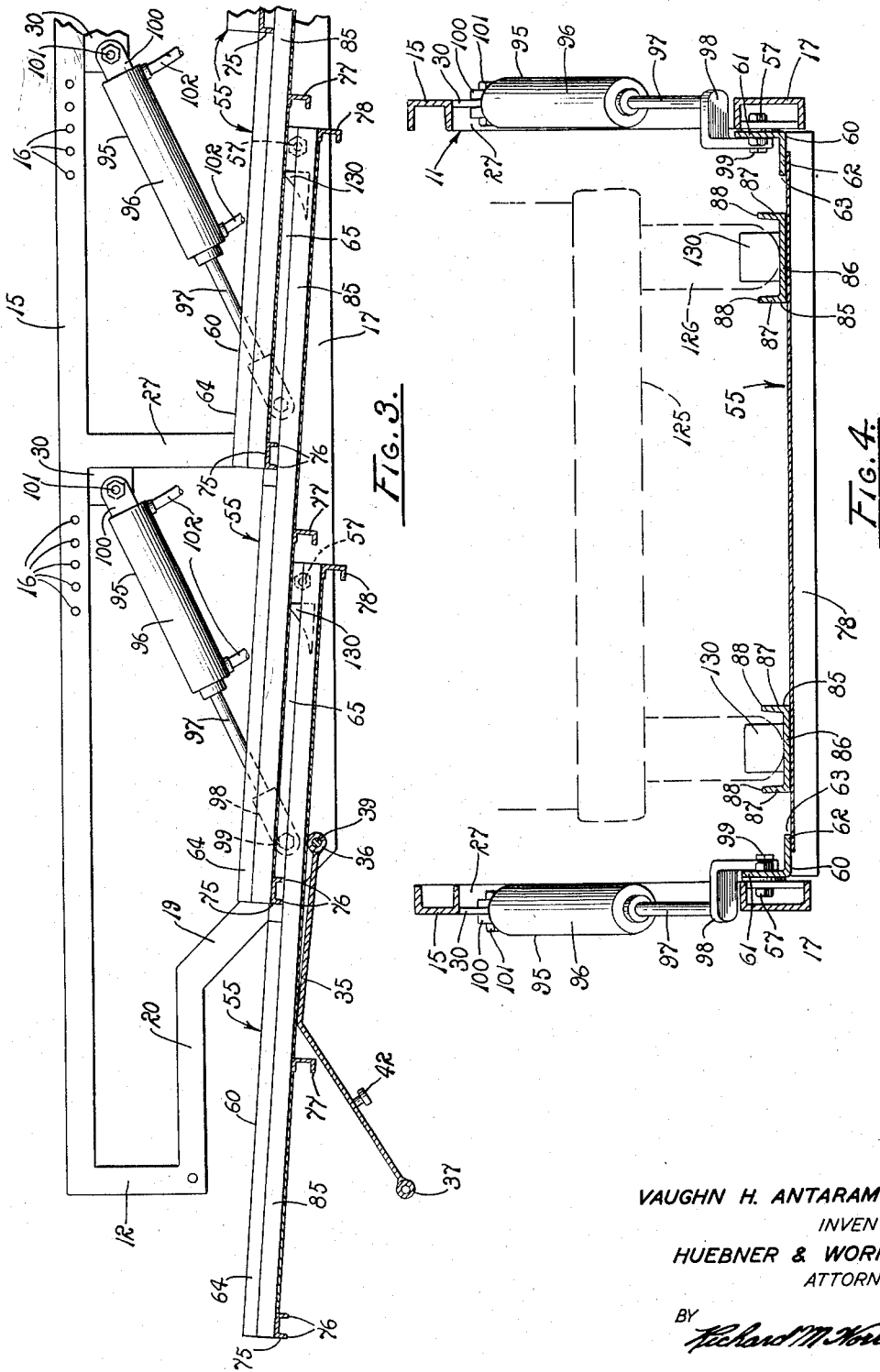

Filed Nov. 18, 1957 3 Sheets-Sheet 3

VAUGHN H. ANTARAMIAN
INVENTOR
HUEBNER & WORREL
ATTORNEYS
BY Richard M. Worrel

United States Patent Office 2,918,326
Patented Dec. 22, 1959

2,918,326

MOBILE VEHICLE CARRIER

Vaughn H. Antaramian, Selma, Calif.

Application November 18, 1957, Serial No. 696,990

6 Claims. (Cl. 296—1)

The present invention relates to a mobile vehicle carrier and more particularly to a carrier, such as a trailer, truck, railroad car or the like, for transporting a plurality of vehicles in compact relation and which is adapted for loading and unloading of the vehicles in rapid succession and in a safe and easy manner.

It is well-known to transport automobiles from manufacturing centers to distributors throughout the country in individual shipments totaling approximately five cars each. Multideck trailers are frequently employed for this purpose; in these, the automobiles are loaded bumper-to-bumper on each deck or in various overlapped relation. Sometimes, in order to transport additional cars without increasing the overall trailer length, provision is made for supporting cars over the cabs of the tractors employed for drawing the trailers.

Although the above described type of trailer has been used extensively, it is difficult, dangerous, and time consuming to load and unload. In addition, there is an inefficient utilization of loading space. The overall height of the trailer when loaded is frequently excessive for passing under trees, power lines, bridges, and the like. The necessity of supporting cars above the tractor cab compels utilization of the trailer with a particular tractor. Thus, a single shipment of cars cannot usually be shifted from tractor to tractor simply by releasing the trailers from their tractors and coupling them to other tractors. Furthermore, the supporting of automobiles on several levels raises the center of gravity of the trailer and its load and renders the vehicle more vulnerable to accident.

In an effort to provide a more efficient use of space available for loading, it has been known to support automobiles in upwardly inclined positions relative to a horizontal flat bed and in spaced parallel relation to each other along the length of the carrying vehicle, such as a trailer on a railroad car. However, the known constructions of this type have been time consuming, difficult and cumbersome to load and unload.

Early structures provided for individually assembling an inclined ramp rigidly in place and thereupon loading it with an automobile before assembling and loading an adjacent ramp. The cars were hoisted or driven up the steeply inclined ramps. Later constructions have utilized elevated stirrups for supporting front or rear wheels of the automobiles in upwardly elevated positions relative to the opposite sets of wheels, the latter being rested on a lower platform or bed. With the latter, inclined releasable or movable ramps have been employed to enable driving the automobiles into upwardly inclined positions to allow the wheels of the automobiles to drop into the stirrups. Alternatively, hoists have been utilized for this purpose.

Accordingly, it is an object of the present invention to provide an improved carrier for transporting a plurality of vehicles which is adapted for convenient loading and unloading of the vehicles.

Another object is to enable the efficient utilization of space on a trailer for supporting and carrying vehicles.

Another object is to provide a vehicle transporting trailer which can be rapidly and safely loaded and unloaded in a minimum of time.

Another object is to provide a vehicle carrying trailer which obviates the need for supporting the vehicles on different levels in vertically spaced relation to each other.

Another object is to provide a trailer of the nature described which has a low center of gravity when loaded.

Another object is to enable the transporting of a maximum number of automobiles in a minimum of space.

Another object is to provide a trailer on which more automobiles can be loaded per trailer length than previously regarded as practical.

Another object is to obviate the need for supporting cars over the cab of a tractor associated with a trailer.

Another object is to enable trailer relaying by providing room for an entire shipment of cars on the trailer.

Other objects are to provide a trailer for transporting vehicles which is economical to construct and to use, dependable in operation, durable in structure, and adapted to support a variety of types of vehicles.

These, together with other objects, will become more fully apparent upon reference to the following description.

In the drawings:

Fig. 1 is a side elevation of a trailer incorporating the principles of the present invention and showing, in dashed outline, a plurality of automobiles loaded on the trailer.

Fig. 2 is a side elevation of the trailer of Fig. 1 which is broken away in the middle and foreshortened for illustrative convenience and showing the trailer in a loading or unloading position.

Fig. 3 is a somewhat enlarged fragmentary, longitudinal vertical section showing portions of the trailer in a loading-unloading position.

Fig. 4 is a somewhat enlarged transverse vertical section taken on line 4—4 of Fig. 2 but showing a portion of an automobile in dashed lines.

Figure 5:
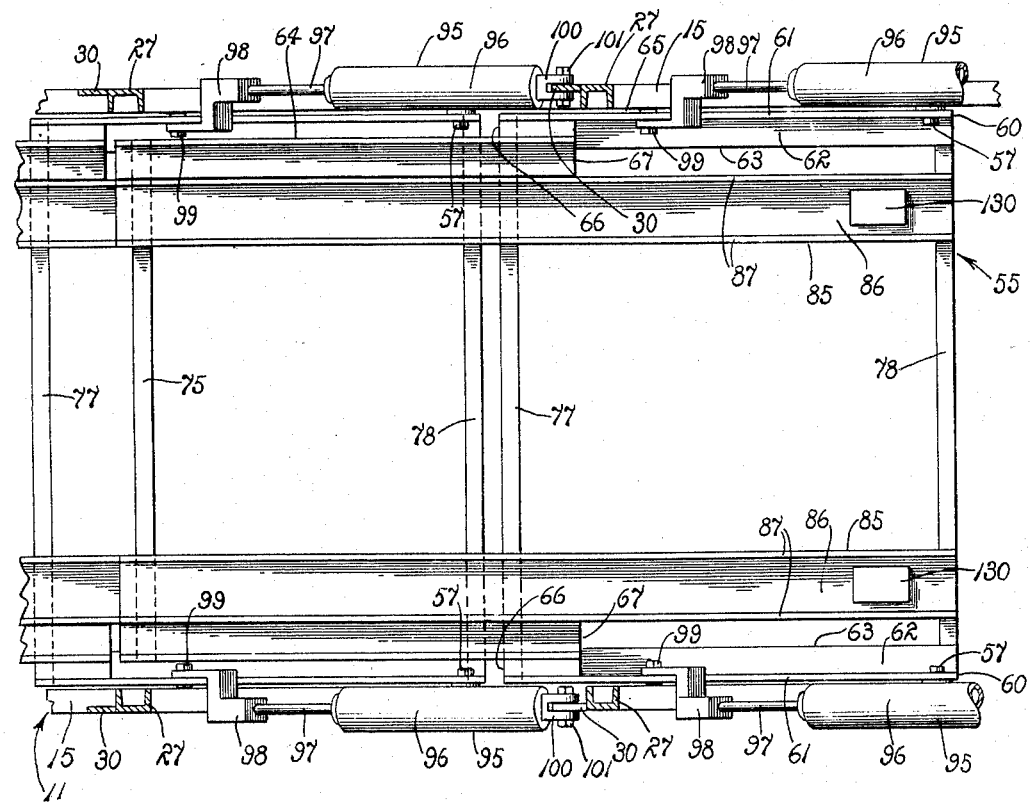
Fig. 5 is a somewhat enlarged fragmentary top plan of the trailer in a loading-unloading position.

Referring more particularly to the drawings, a trailer embodying the features of the subject invention is shown in Fig. 1 and generally indicated by the numeral 10. The trailer provides a chassis 11 having open front and rear ends 12 and 13, respectively, and laterally spaced, longitudinally extended substantially vertical side portions 14.

Each side portion 14 includes an elongated upper, longitudinally extended member 15 providing a plurality of groups of apertures 16 in longitudinally spaced relation therealong. Also in each side portion is included a lower longitudinal member 17 having a rear lower section 18, a forwardly upwardly inclined intermediate section 19, and an upper horizontal front section 20. The rear lower section provides a plurality of groups of longitudinally spaced openings 22.

Each side portion 14 of the chassis 11 also includes a plurality of longitudinally spaced vertical struts 27, the rearwardmost of which has a rear upper extension 28. Also, intermediate, horizontal rear braces 29 rigidly interconnect the rearwardmost struts. Webs 30 are secured to the upper longitudinal members 15 and the adjacent struts at their corners of intersection.

An angulated front coupling plate 35 provides a rear edge sleeve 36 and a front edge sleeve 37. An elongated rear shaft 39 is extended through the forward ends of the lower rear sections 18 of the side portions 14 and this rear sleeve. In this manner the coupling plate is pivotally connected to the front end 12 of the chassis 11 for elevational pivotal movement between an upper transporting position, as shown in Fig. 1, and a lower loading position, as shown in Fig. 2. In the upper position, it will be noted that the contour of the plate conforms to the contour of the intermediate and front sections 19 and 20 of the lower longitudinal side members 17. Further, latch bolts 40 are provided for extension through the side portions of the chassis and into the front sleeve 37 of the plate for releasably locking the coupling plate in its transporting position. A downwardly extended kingpin 42 is provided on the underside of the coupling plate for connection to a draft vehicle, not shown, but believed to be well understood in the art.

Rear support wheels 45 are provided for supporting the chassis 11 for earth traversing movement in a path aligned with the longitudinal dimension of the chassis. Retractable support legs 46 are mounted on the lower rear sections 18 of the side portions 14. The support legs are movable between extended positions, as shown in Fig. 1, for supporting the chassis in substantially horizontal position, and retracted position. Pins 47 extend through apertures in the chassis side portions and the legs for locking the legs in either of their positions.

A plurality of ramps 55 provide rear mounting ends 56 pivotally mounted in the chassis 11 on pins 57 in longitudinally spaced relation for elevational pivotal movement between upper loaded or transporting positions, as seen in Fig. 1, wherein the ramps are substantially parallel to each other, and lower partially overlapped, loading or unloading positions, as fragmentarily illustrated in Figs. 2, 3 and 5. For purposes of convenient reference, the ramps have front adjusting ends 58. It will be noted that the front four ramps are pivotally connected by means of the openings 22 in the lower longitudinal side members 17 whereas the rearwardmost ramp is pivotally connected by means of openings 22' in the intermediate rear brace 29.

With particular reference to Figs. 3, 4 and 5, each of the ramps 55 has a pair of transversely spaced, substantially parallel, right-angular side bars 60 each having a vertical flange 61 and a horizontal flange 62 coplanar with the horizontal flange of its opposite side bar. Further, each horizontal flange of each side bar has an inner edge 63. For purposes of compactly overlapping the ramps 55 in interfitted relationship, the side bars are divided into rigidly interconnected front and rear sections 64 and 65 having rear and front edges 66 and 67, respectively. By particular reference to Fig. 5, it will be noted that the front sections of a pair of side bars are inwardly laterally offset from their respective rear sections. A plurality of longitudinally spaced holes 68 are provided in the vertical flange of the rear section of each side bar.

Front transverse bars 75 rigidly interconnect the front ends 58 of the side bars 60. Each front transverse bar conveniently consists of a downturned channel having lower edges 76. Further, intermediate and rear transverse bars 77 and 78 rigidly interconnect the side bars in longitudinally spaced relation to each other and to the front transverse bars, all as best seen in Figs. 3 and 5.

Each ramp 55 also provides a pair of transversely spaced upwardly open inner channels 85 having lower central flanges 86 secured to the transverse bars 75, 77 and 78 and upwardly extended side flanges 87 terminating in upper edges 88. The outermost side flanges 87 of the inner channels are secured, as by welding, to the inner edges 63 of the front sections 65 of the side bars 60.

A plurality of pairs of lift rams 95 are employed for moving the ramps 55 between their loading and transporting positions. Each ram includes a cylinder 96 and a reciprocal piston rod 97. A Z-shaped ramp lug 98 is connected to the piston rod and is also pivotally connected to the vertical flange 61 of the rear section 65 of the side bar 60 of each of the ramps 55 by means of a pin 99. Further, a bifurcated chassis lug 100 is connected to each cylinder and pivotally connected by means of a pin 101 to each of the webs 30. Hoses 102 are provided for admitting and releasing hydraulic fluid to and from the cylinders of the rams. Although the rams associated with the front four ramps are as described above, the rearwardmost rams have their chassis lugs pivotally connected to the upper rear extensions 28.

When the ramps 55 are in their transporting upper positions, they are held in such positions and the load relieved from the rams 95 by means of rigid links 106 and 107 interconnecting the ramps adjacent to their front ends 58 and the side portions 14 of the chassis 11. Bolts 108 are provided for effecting these connections of the links. As best seen in Fig. 1, lower bolts 108 are extended through the apertures 16 in the side portions of the chassis. The angle of inclination of the ramp may be adjusted by employing selected pairs of these apertures.

With particular reference to Fig. 2, wherein the trailer 10 is fragmentarily illustrated and the ramps 55 are shown in their loading or unloading positions, an elevationally adjustable jack 115 supports the front end 58 of the forwardmost ramp. An auxiliary loading ramp 116 provides a lower edge 117 rested on the ground 118 forwardly of the trailer 10 and rear tongues 119 releasably rested in the channels 85 on their central flanges 86. In actual construction, the auxiliary ramps are preferably upwardly disposed channel members.

Operation

The operation of the described embodiment of the subject invention is believed to be readily apparent and is briefly summarized at this point.

The manner of loading the trailer 10 with a plurality of automobiles 125 is best described by reference to Fig. 2. Preliminarily, with the legs 46 lowered, the rams 95 are extended to lower the ramps 55 into overlapping relation. In these positions, the front ends 58 of the ramps fit within the rear ends 56 of their respectively adjacent ramps. Further, the lower edges 76 of the front transverse bars 75 rest on the upper edges 88 of the channels 85 of the respectively forwardly adjacent ramps. Obviously, the channels 85 are in longitudinal alignment throughout the length of the trailer.

The jacks 115 are placed under the front end 58 of the forwardmost ramp 55 and the auxiliary ramps 116 positioned on said forwardmost ramp. Of course, the coupling plate 35 is initially lowered to permit full lowering of the forwardmost ramp.

One of the automobiles 125 is driven up the auxiliary ramps 116 so that the wheels 126 of the automobile ride in the inner channels 85. The automobile is driven over each of the ramps and stopped on the rearwardmost ramp. The lift rams 95 associated with the rearwardmost ramp are then contracted to raise the rearwardmost ramp and its associated automobile into the position shown in Fig. 1. With hydraulic pressure still applied, the rearwardmost links 107 are connected so that the ramp and automobile are rigidly held in forwardly upwardly inclined position. At this point, the pair of rams may be disconnected for use on other ramps and thus a single pair of rams is adequate for the entire vehicle. However for illustrative convenience, a ram is shown wherever a ram is used.

Another automobile 125 is then driven up the auxiliary ramps 116 and over the ramps 55 to the penultimate ramp and this ramp is elevated and the links connected, as before. In like manner, the other automobiles are driven onto and elevated into transporting positions on their respective ramps. It is to be understood that with each of the automobiles, blocks 130 are preferably placed against their respective wheels in the channels 85 and that chains, not shown, are connected around the wheels, axles, or the like, of the automobiles and their respective ramps 55 securely to hold the automobiles in place. These procedures are well-known in the art and inasmuch as they have no specific relation to the present invention, they are not described in greater detail.

The coupling plate 35 is then raised, the latch bolts 40 inserted, the legs 46 retracted, and the trailer 10 connected to a driven vehicle such as a truck, not shown.

When the trailer 10 with its load of automobiles 125 has reached its destination, the support legs 46 are dropped into ground engagement and the coupling plate 33 is lowered after the trailer 10 is disconnected from its drawing vehicle, not shown. With hydraulic pressure applied to the lift rams 95, the links 106 and 107 are disconnected and the forwardmost rams extended to lower the forwardmost ramp. The jacks 115 are placed underneath the front end 58 of the front ramp and the auxiliary ramps 116 placed in their described positions. When the front automobile has been disconnected from its ramp, it is backed off from the trailer. In like manner, each of the other automobiles may be unloaded. Of course, one or more of the automobiles may be unloaded at any set destination while the other automobiles remain on the trailer for subsequent delivery.

Although the ramps 55 are shown as pivotal upwardly into inclined positions relative to substantially horizontal positions, they could as well pivot downwardly into declined positions from substantially horizontal positions; in the latter instance the side portions 14 of the chassis 11 would obviously have to extend higher so the pivotal connections of the ramps could be raised.

From the foregoing, it will be evident that a trailer has been provided for transporting a plurality of vehicles in a compact and efficient manner. The trailer is adapted for loading and unloading of the automobiles in rapid succession and in a safe and easy manner. Utilization of a plurality of ramps movable between substantially parallel upwardly inclined transporting positions and overlapped lower loading positions obviates the commercial practice of supporting automobiles on multi-levels and enables carrying all of the automobiles on the trailer. As such, the practice known as relaying can be effectively accomplished simply by disconnecting the trailer from one truck and connecting it to another without having to unload an automobile from a position above the truck cab.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A carrier for transporting vehicles loaded thereon comprising an elongated substantially rectangular chassis, means mounting the chassis for earth traversing movement longitudinally thereof and in a substantially horizontal position, a plurality of vehicle ramps having mounted end portions and oppositely extended end portions, means individually pivotally mounting the mounted end portions of the ramps directly on the chassis in longitudinally spaced relation for elevational pivotal movement around substantially parallel axes disposed transversely of the chassis for movement between loading-unloading positions with the extended ends of the ramps adjacent to and overlapping mounted ends of respectively adjacent ramps, the pivot axes of the ramps being fixed with respect to the chassis in longitudinally spaced relation therealong, and loaded positions acutely angularly inclined with respect to their loading-unloading positions, and means connected to the ramps for moving the ramps between said positions and for releasably holding the ramps in said loading positions.

2. A carrier for transporting vehicles loaded thereon comprising an elongated substantially rectangular chassis having transversely spaced upstanding side walls providing elongated lower portions, means connected adjacent to the lower portions of the side walls mounting the chassis for earth traversing movement longitudinally thereof, a plurality of vehicle ramps having mounted end portions pivotally mounted directly on the lower portions of the side walls on substantially horizontal axes in longitudinally spaced, transversely extended relation, and oppositely extended end portions, the ramps being elevationally pivotal between substantially horizontal lower loading positions with said extended end portions overlying the mounted end portions of respectively adjacent ramps, and upwardly inclined upper loaded positions in spaced substantially parallel relation to each other, and rigid links releasably individually interconnecting the side walls and the ramps in their loaded positions for supporting the ramps in such loaded positions.

3. A trailer adapted for connection to a drawing vehicle for transporting a plurality of vehicles adapted to be loaded on and unloaded from the trailer comprising an elongated substantially rectangular chassis having forward and rearward ends, the chassis further having upstanding transversely spaced parallel side walls providing upper and lower edges, one of the ends of the chassis being open between the side walls for loading and unloading the trailer; ground engaging wheels mounting the chassis for earth traversing movement longitudinally thereof; means connected to the forward end of the chassis for coupling the chassis to a drawing vehicle; a plurality of ramps individually adapted to support a vehicle and having rear end portions and forward end portions; means individually pivotally connecting the rear end portions of the ramps directly to the side walls of the chassis in closely adjacent relation to the lower edges of the side walls and in spaced relation longitudinally of the chassis for elevational adjustable movement of the ramps about axes provided by the pivotal connections of the ramps to the chassis between lower vehicle loading and unloading positions with adjacent forward and rearward end portions of adjacent ramps being in overlapping contact to enable movement of vehicles longitudinally of the chassis to and from their individual ramps, and upwardly angularly inclined vehicle transporting positions in spaced substantially parallel relation to each other, the pivot axes of the ramps being in predetermined substantially fixed spaced relation longitudinally of the chassis; elongated rigid links having lower ends releasably connected to the side walls and in longitudinally spaced relation therealong and upper ends individually releasably connected to the forward end portions of the ramps in their transporting positions for supporting the ramps in such positions; and powered means individually interconnecting the ramps and the chassis for individually raising and lowering the ramps.

4. A trailer adapted for connection to a drawing vehicle for transporting a plurality of automobiles adapted to be loaded on and unloaded from the trailer comprising an elongated substantially rectangular chassis having forward and rearward ends, and upstanding transversely spaced parallel side walls, the forward and rearward ends of the chassis being open between the side walls; ground engaging wheels mounting the rearward end of the chassis for earth traversing movement longitudinally thereof; means connected to the forward end of the chassis for coupling the chassis to a drawing vehicle; a plurality of ramps individually adapted to support an automobile, the ramps having transversely spaced parallel longitudinally extended upwardly disposed channels, rear mounted end portions, and forward end portions; pairs of longitudinally spaced pins transversely extended through the side walls, the pins in each pair of pins being axially aligned transversely of the chassis, the rear end portions of the ramps being individually journaled on the pairs of pins and thereby directly connected to the chassis for elevational adjustable movement of the ramps between lower automobile loading and unloading positions with adjacent forward and rearward end portions of adjacent ramps being in overlapping contact and the channels in substantially continuous alignment on the respective sides of the ramps to enable movement of automobiles longitudinally of the chassis to and from their individual ramps, and upwardly angularly inclined automobile transporting positions in spaced substantially parallel relation to each other; elongated rigid links having lower ends releasably connected to the side walls and in longitudinally spaced relation therealong and upper ends individually releasably connected to the forward end portions of the ramps in their transporting positions for supporting the ramps in such positions; and hydraulic rams individually interconnecting the ramps and the chassis for individually raising and lowering the ramps.

5. A trailer adapted for connection to a drawing vehicle for transporting a plurality of automobiles adapted to be loaded on and unloaded from the trailer comprising an elongated substantially rectangular chassis having forward and rearward ends, and upstanding transversely spaced parallel side walls, the forward end of the chassis being open between the side walls for loading and unloading the automobiles; ground engaging wheels mounting the rearward end of the chassis for earth traversing movement longitudinally thereof; a plurality of ramps individually adapted to support automobiles, the ramps having transversely spaced parallel longitudinally extended upwardly disposed channels, rear mounted end portions, and forward end portions; pairs of longitudinally spaced pins transversely extended through the side walls, the pins in each pair of pins being axially aligned transversely of the chassis, the rear end portions of the ramps being individually journaled on the pairs of pins for elevational adjustable movement of the ramps between lower automobile loading and unloading positions with adjacent forward and rearward end portions of adjacent ramps being in overlapping contact and the channels in substantially continuous alignment on the respective sides of the ramps to enable movement of automobiles longitudinally of the bed to and from their individual ramps, and upper automobile transporting positions upwardly angularly inclined relative to their loading and unloading positions and in spaced substantially parallel relation to each other; a front coupling plate pivotally mounted on the side walls of the chassis in the front open end thereof for movement between a transporting position wherein it is adapted for connection to a drawing vehicle and a lower loading position opening the front end of the frame and permitting descent of the forwardmost ramp; an auxiliary ramp supported in inclined position on the forwardmost ramp in its loading and unloading positions for enabling ascent and descent of automobiles on and from the trailer; elongated rigid links having lower ends releasably connected to the side walls in longitudinally spaced relation therealong and upper ends individually releasably connected to the forward end portions of the ramps in their transporting positions for supporting the ramps in such positions; and hydraulic rams individually interconnecting the ramps and the chassis for individually raising and lowering the ramps.

6. A trailer for transporting a plurality of vehicles adapted to be loaded and unloaded from the trailer comprising an elongated substantially rectangular chassis having forward and rearward ends, and upstanding transversely spaced substantially parallel longitudinally extended side walls; means mounting the chassis for earth traversing movement longitudinally thereof; a plurality of ramps individually adapted to support vehicles thereon, the ramps having transversely spaced, substantially parallel, longitudinally extended, upwardly disposed channels, rear mounted end portions, and forward end portions; pairs of longitudinally spaced pins transversely extended through the side walls, the pins in each pair of pins being axially aligned transversely of the chassis, the rear end portions of the ramps being individually journaled on the pairs of pins and thereby directly connected to the chassis for elevational adjustable movement of the ramps between lower vehicle loading and unloading positions with adjacent forward and rearward end portions of adjacent ramps being in overlapping relation and the channels being in substantially continuous alignment on the respective sides of the ramps to enable movement of vehicles longitudinally of the chassis to and from their individual ramps, and upwardly angularly inclined vehicle transporting positions in spaced substantially parallel relation to each other; and means individually interconnecting the ramps and chassis for releasably holding the ramps in their transporting positions.

References Cited in the file of this patent

UNITED STATES PATENTS 1,777,422   Winn _____ Oct. 7, 1930